United States Patent
Su et al.

(10) Patent No.: US 8,860,695 B2
(45) Date of Patent: Oct. 14, 2014

(54) OPTICAL TOUCH SYSTEM AND ELECTRONIC APPARATUS INCLUDING THE SAME

(75) Inventors: Tzung Min Su, Hsinchu (TW); Cheng Nan Tsai, Hsinchu (TW); Sen Huang Huang, Hsinchu (TW); Chih Hsin Lin, Hsinchu (TW)

(73) Assignee: Pixart Imaging Inc., Hsin-Chu (TW)

( * ) Notice: Subject to any disclaimer, the term of this patent is extended or adjusted under 35 U.S.C. 154(b) by 219 days.

(21) Appl. No.: 13/561,759

(22) Filed: Jul. 30, 2012

(65) Prior Publication Data
US 2013/0033456 A1 Feb. 7, 2013

(30) Foreign Application Priority Data
Aug. 5, 2011 (TW) .............................. 100127927 A

(51) Int. Cl.
*G06F 3/042* (2006.01)
(52) U.S. Cl.
CPC .................................. *G06F 3/0421* (2013.01)
USPC .......................................................... 345/175
(58) Field of Classification Search
USPC ......................................... 345/175, 158, 166
See application file for complete search history.

(56) References Cited

U.S. PATENT DOCUMENTS

| | | | |
|---|---|---|---|
| 4,782,328 A | | 11/1988 | Denlinger |
| 6,040,909 A | * | 3/2000 | Hasegawa et al. ............. 356/614 |
| 6,686,580 B1 | * | 2/2004 | Glenn et al. ................ 250/208.1 |
| 7,689,381 B2 | | 3/2010 | Lin et al. |
| 2010/0207911 A1 | * | 8/2010 | Newton ......................... 345/175 |
| 2011/0061950 A1 | * | 3/2011 | Cheng et al. ................ 178/18.09 |
| 2011/0102705 A1 | * | 5/2011 | Miyazaki et al. ................ 349/61 |
| 2011/0115705 A1 | * | 5/2011 | Watanabe ...................... 345/158 |
| 2011/0169738 A1 | * | 7/2011 | Reigneau ...................... 345/166 |
| 2011/0291993 A1 | * | 12/2011 | Miyazaki et al. ............. 345/175 |
| 2012/0205166 A1 | * | 8/2012 | Huang et al. ................ 178/18.09 |
| 2012/0307323 A1 | * | 12/2012 | Sekine .......................... 358/482 |
| 2012/0327037 A1 | * | 12/2012 | Su et al. ....................... 345/175 |

* cited by examiner

*Primary Examiner* — Fred Tzeng
(74) *Attorney, Agent, or Firm* — Juan Carlos A. Marquez; Bacon & Thomas PLLC

(57) ABSTRACT

An optical touch system includes a touch surface having a first touch region and a second touch region, a reflective member for generating a reflection of an object on the touch surface, an image sensor for providing an image of the object and an image of the reflection, and a processing unit. The image sensor is represented by either first reference coordinate data or second reference coordinate data. The processing unit is configured to compute the coordinate data of the object using the first reference coordinate data, the image of the object, and the image of the reflection when the object is in the first touch region, and configured to compute the coordinate data of the object using the second reference coordinate data, the image of the object, and the image of the reflection when the object is in the second touch region.

29 Claims, 15 Drawing Sheets

OPTICAL TOUCH SYSTEM AND ELECTRONIC APPARATUS INCLUDING THE SAME

CROSS-REFERENCE TO RELATED APPLICATION

The present application is based on, and claims priority from, Taiwan Patent Application Ser. No. 100127927, filed on Aug. 5, 2011, the disclosure of which is hereby incorporated by reference herein in its entirety.

BACKGROUND

1. Technical Field

The present invention relates to an optical touch system and an electronic apparatus comprising the same.

2. Related Art

FIG. 1 shows a current optical touch screen system 1 disclosed in U.S. Pat. No. 4,782,328. As shown in FIG. 1, the optical touch screen system 1 comprises two image sensors 11 configured to capture the image of an object 13 on a touch screen 12. The processor 14 is coupled with the two image sensors 11 for processing the images from the two image sensors 11 to decide sensing paths 15 respectively connecting the object 13 and the two image sensors 11, and calculates the coordinates of the object 13 using the sensing paths 15.

The coordinates of the object 13 are those of the intersection of the two sensing paths 15. The sensing path 15 is determined by sensing paths 16 that respectively pass through the corresponding edges of the object 13, and the sensing paths 16 are determined by the edges of the dark image of the object 13 captured by the image sensor 11. The detailed calculation method is disclosed in U.S. Pat. No. 4,782,328, which is incorporated herein by reference.

FIG. 2 shows another current optical touch screen system 2. U.S. Pat. No. 7,689,381 B2 (or counterpart Taiwan Publication Patent No. 201003477) discloses an optical touch screen system 2. The optical touch screen system 2 comprises a mirror 21, two light sources 22, an image sensor 23, and a processor 24. The mirror 21 and the two light sources 22 are disposed at the periphery of a touch area. The mirror 21 is configured to generate a reflection 26 of an object 25. The image sensor 23 is configured to generate an image of the object 25 and an image of the reflection 26. The processor 24 determines the coordinates of the object 25 according to the image of the object 25 and the image of the reflection 26.

The processor 24 determines a sensing path 27 passing through the image of the object 25 and another sensing path 27 passing through the image of the reflection 26. The sensing paths 27 can be determined by the calculation method disclosed in U.S. Pat. No. 4,782,328. Next, the coordinates (x, y) of the object 25 can be calculated by equations (1) and (2) as follows:

$$x = \frac{2L}{\tan(\theta_1) + \tan(\theta_2)} \quad (1)$$

$$y = \frac{2L}{\tan(\theta_1) + \tan(\theta_2)} \tan(\theta_1) \quad (2)$$

where L is the distance between the mirror 21 and the edge of a touch area opposite to the mirror 21; $\theta_1$ and $\theta_2$ are the included angles between a sensing path and an edge of the touch area.

SUMMARY

One embodiment of the present invention provides an optical touch system comprising a touch surface, a reflective member, an image sensor, and a processing unit. The touch surface comprises a first touch region and a second touch region. The reflective member is configured to generate a reflection of an object on the touch surface. The image sensor is configured to provide an image of the object and an image of the reflection, wherein the image sensor is represented by either first reference coordinate data or second reference coordinate data. The processing unit is configured to compute coordinate data of the object using the first reference coordinate data, the image of the object and the image of the reflection when the object is in the first touch region. The processing unit is also configured to compute the coordinate data of the object using the second reference coordinate data, the image of the object, and the image of the reflection when the object is in the second touch region.

Another embodiment of the present invention discloses an optical touch system comprising a touch surface, an image sensor, and a processing unit. The touch surface comprises a first touch region and a second touch region. The image sensor is configured to generate at least one image of an is object. The image sensor can be represented by either first reference coordinate data or second reference coordinate data. The processing unit is configured to select either the first reference coordinate data or the second reference coordinate data as predetermined coordinate data according to the object being in either the first touch region or the second touch region.

One embodiment of the present invention discloses an electronic apparatus comprising an optical touch system and a display device. The optical touch system comprises a touch surface, an image sensor, and a processing unit. The touch surface comprises a first touch region and a second touch region. The image sensor is configured to generate at least one image of an object. The processing unit is configured to compute coordinate data according to the at least one image of the object. The display device is disposed adjacent to the optical touch system. The display device is configured to provide first display content in the first touch region and second display content in the second touch region. The electronic apparatus is configured to control the first display content in the first touch region or the second display content in the second touch region according to the coordinate data of the object.

Another embodiment of the present invention discloses an optical touch system that comprises a touch surface, an image sensor, and a processing unit. The touch surface comprises a first touch region and a second touch region. The image sensor is configured to generate at least one image of an object. The processing unit is coupled with the image sensor and configured to output coordinate data of the object when the object is in the first touch region and to output a gesture event when the object is in the second touch region.

Another embodiment of the present invention discloses an optical touch system that comprises at least one image sensor and a processing unit. The at least one image sensor is configured to generate a picture comprising at least one image of an object. The at least one image sensor can be represented by either first reference coordinate data or second reference coordinate data. The processing unit is configured to determine a distance between the image of the object and a predetermined boundary of the picture, and to use the first reference coordinate data as predetermined coordinate data when the distance is greater than a threshold value.

To provide a better understanding of the above-described objectives, characteristics and advantages of the present invention, a detailed explanation is provided in the following embodiments with references to the drawings.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1:
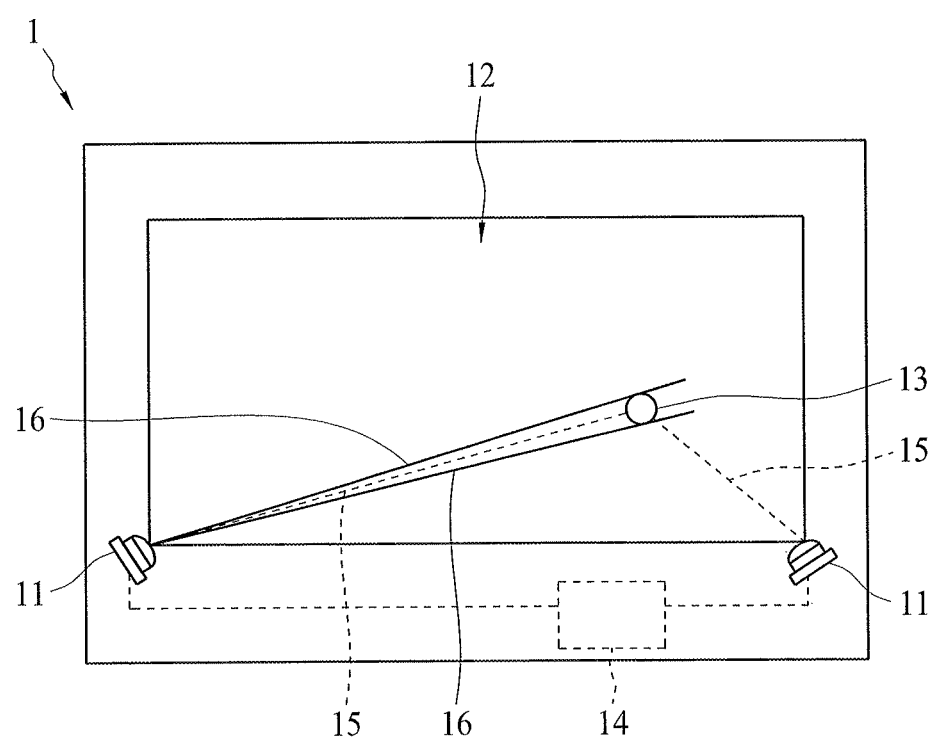
FIG. 1 shows a current optical touch screen system.
Figure 2:
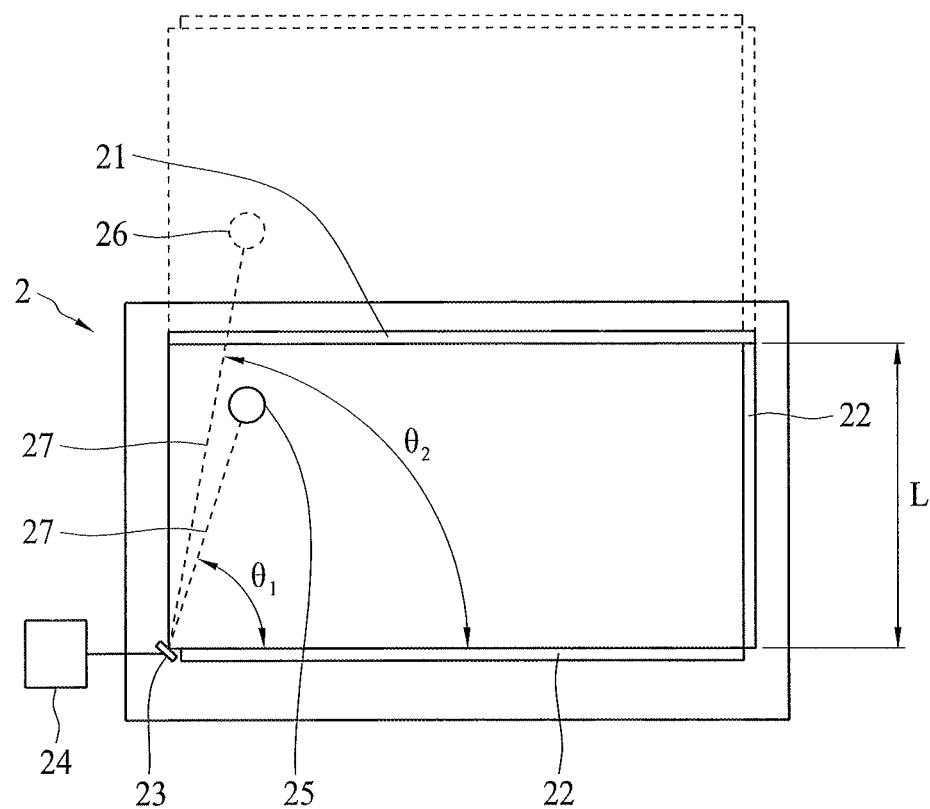
FIG. 2 shows another current optical touch screen system.
Figure 3:
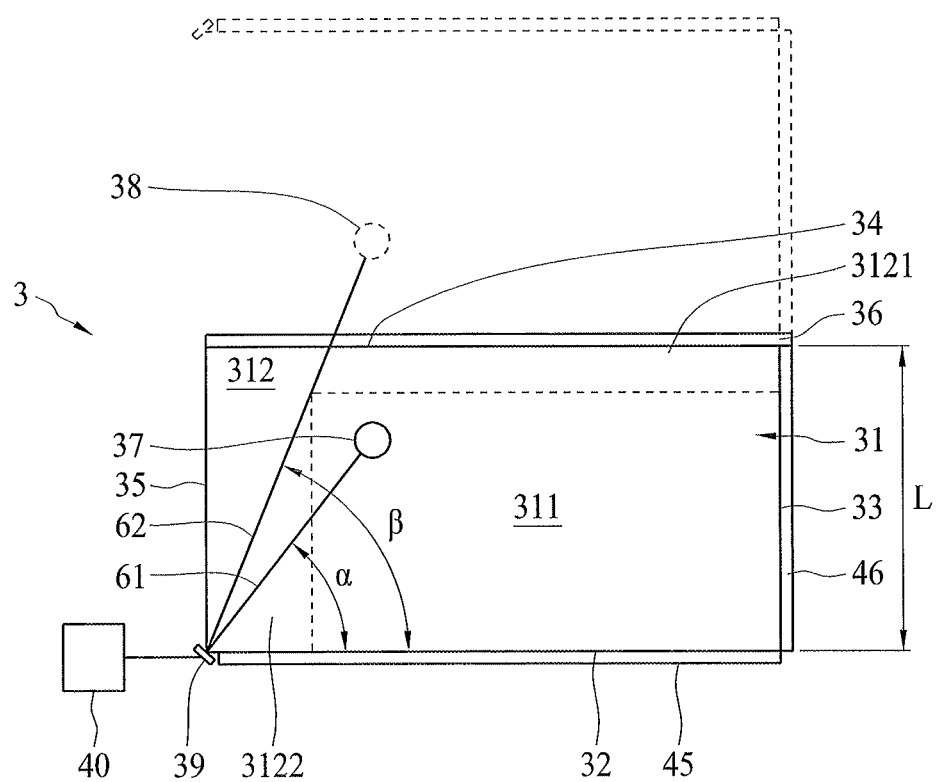
FIG. 3 is an illustration schematically depicting an optical touch system according to one embodiment of the present invention.
Figure 4:
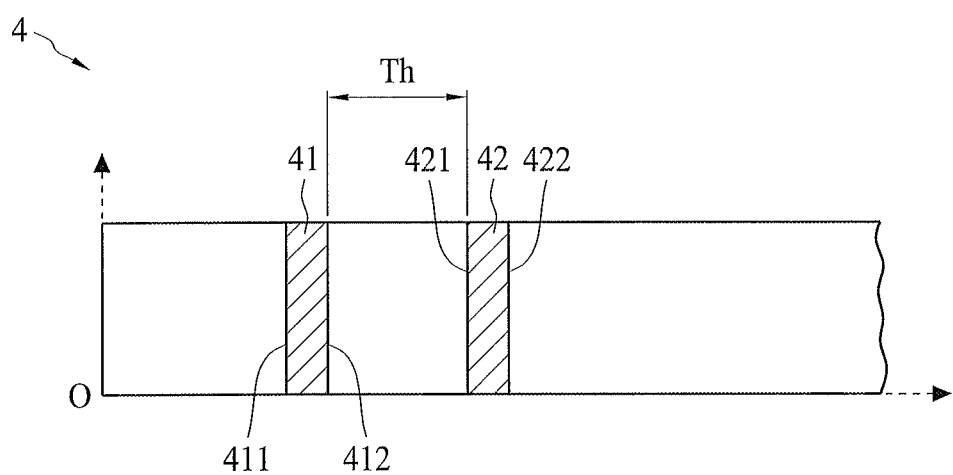
FIG. 4 is an illustration schematically depicting a picture generated by an image sensor according to one embodiment of the present invention.

FIG. 3 is an illustration schematically depicting an optical touch system 3 according to one embodiment of the present invention. FIG. 4 is an illustration schematically depicting a picture generated by an image sensor according to one embodiment of the present invention. Referring to FIGS. 3 and 4, the optical touch system 3 comprises a touch surface 31, a reflective member 36, an image sensor 39, and a processing unit 40. The touch surface 31 can be defined by a first edge 32, a second edge 33, a third edge 34, and a fourth edge 35. The reflective member 36 is disposed adjacent to the third edge 34 and configured to create a reflection 38 of an object 37 on the touch surface 31. The image sensor 39 is configured to generate a picture 4, as shown in FIG. 4, which may comprise an image 41 of the object 37 and an image 42 of the reflection 38. In the present embodiment, the image sensor 39 is disposed near the corner of the touch surface 31 opposite to the reflective member 36.

In one embodiment, the reflective member 36 comprises a mirror.

In one embodiment, the optical touch system 3 further comprises two light providing members 45 and 46 that may be respectively disposed adjacent to the first edge 32 and the second edge 33. The light providing members 45 and 46 are configured to provide light for creating the image 41 of the object 37 and the image 42 of the reflection 38. The light providing member 45 or 46 can be a retro-reflector or mirror, or a linear light source. The linear light source may comprise a plurality of light-emitting elements that can be arranged along the first edge 32 or the second edge 33, or comprise a light guide and a light emitting element that provides light propagating in the light guide so as to allow the light guide to emit light over the touch surface 31.

In one embodiment, if the light providing members 45 and 46 are retro-reflectors, at least one light emitting element is preferably disposed adjacent to the periphery of the touch surface 31 such that the light providing members 45 and 46 can retro-reflect the light from the at least one light emitting element toward the entire touch surface 31.

In one embodiment, at least one light emitting element is disposed adjacent to the image sensor 39.

Referring to FIGS. 3 and 4, an included angle α between the sensing path 61 and the first edge 32 and an included angle β between the sensing path 62 and the first edge 32 can be determined according to the image 41 of the object 37 and the image 42 of the reflection 38 included in the picture 4. The sensing path 61 is a line extending from reference coordinate data toward the object 37, and the sensing path 62 extends from reference coordinate data toward the reflection 38. In one embodiment, the sensing path 61 can extend from the reference coordinate data toward the center of gravity, the central point or an edge of the object 37. The sensing path 62 can extend from the reference coordinate data toward the center of gravity, the central point, or an edge of the reflection 38.

After the calculation of the included angles α and β according to the picture 4, if the reference coordinate data is (0, 0) and the coordinate data of the object is $(x_o, y_o)$, the coordinate data $(x_o, y_o)$ can be computed using the following equations (3) and (4).

$$\frac{y_o}{x_o} = \tan\alpha \quad (3)$$

$$L = \frac{x_o}{2}[\tan\alpha + \tan\beta] \quad (4)$$

If another reference coordinate data (a, b) is used to compute the coordinate data (x, y) of the object 37, the following equation (5) is adopted.

$$\frac{y+b}{x+a} = \tan\alpha \quad (5)$$

It can be seen by comparing the equation (3) and the equation (5) that using different reference coordinate data (0, 0) and (a, b), will result in obtaining different coordinate data of the object 37.

Referring to FIG. 3, on the touch surface 31, the application of different reference coordinate data to different touch regions as predetermined reference coordinate data can significantly minimize the deviation between computed object coordinate data indicating the location of the object and the position where the object is really located. In the present embodiment, the touch surface 31 may comprise a first touch region 311 and a second touch region 312, and correspondingly, the optical touch system 3 comprises first reference coordinate data and second reference coordinate data that can be applied to represent the image sensor 39. When the object 37 is in the first touch region 311, the processing unit 40 can calculate more accurate coordinate data by using the first reference coordinate data, and when the object 37 is in the second touch region 312, the processing unit 40 can calculate more accurate coordinate data by using the second reference coordinate data.

In one embodiment, the first touch region 311 can be a primary operating region, and the first reference coordinate data can be a predetermined reference coordinate data. The primary operating region occupies most of the touch surface 31. Most touch operations are performed in the primary operating region. In one embodiment, the first reference coordinate data is the origin (0, 0).

In one embodiment, the second touch region 312 comprises a region extending adjacent to two edges 34 and 35 of the touch surface 31.

The number of partitioned touch regions is not limited and the number may be determined according to the accuracy requirements for the calculation of the coordinate data of an object. The shapes or areas of partitioned touch regions are not limited.

In one embodiment, the second touch region 312 has a section 3121 is that extends by the reflective member 36. Because the section 3121 is close to the reflective member 36, the image 41 of the object 37 and the image 42 of the reflection 38 may be very close to each other, even obscured with each other in a captured image of the image sensor 39 when the object 37 is in the section 3121. In one embodiment, the image sensor 39 generates a picture, which is then analyzed by the processing unit 40. If the image 41 of the object 37 and the image 42 of the reflection 38 are merged in a captured image of the image sensor 39, the processing unit 40 uses the second reference coordinate data relating to the second touch region 312 to calculate the coordinate data of the object 37.

The image sensor 39 generates a picture 4. When the object 37 is close to the fourth edge 35, the image 41 of the object 37 is close to the origin O of the picture 4. In one embodiment, the processing unit 40 analyzes the picture 4 to calculate a positional value representing the left boundary 411 of the image 41 and a positional value representing the right boundary 412 of the image 41, and to calculate a positional value representing the left boundary 421 of the image 42 and a positional value representing the right boundary 422 of the image 42. The processing unit 40 compares the positional value representing the right boundary 412 of the image 41 and the positional value representing the left boundary 421 of the image 42 with the threshold value (Th). When a distance between the positional value representing the right boundary 412 of the image 41 and the positional value representing the left boundary 421 of the image 42 is greater than a threshold value (Th), the processing unit 40 uses the first reference coordinate data to calculate the coordinate data of the object 37. When the processing unit 40 determines that the distance between the positional value representing the right boundary 412 of the image 41 and the positional value representing the left boundary 421 of the image 42 is not greater than the threshold value (Th), the processing unit 40 uses the second reference coordinate data to calculate the coordinate data of the object 37.

In one embodiment, the second touch region 312 has a section 3122 that extends the fourth edge 35 extending between the reflective member 36 and the image sensor 39.

In some embodiments of the present invention, the measurements of the positions of an object and the computations of the coordinate data of the object can be comprehensively performed at different locations of the touch surface 31 such that the deviation is between the computed object coordinate data and the real object coordinate data at each location. Different touch regions can be sectioned out according to the amounts of the deviations, and then, each touch region is assigned suitable reference coordinate data representing the image sensor. With suitable reference coordinate data, the coordinate data of the object in each touch region can be accurately computed. The first and second reference coordinate data can be obtained using the above-described procedures.

Figure 5:
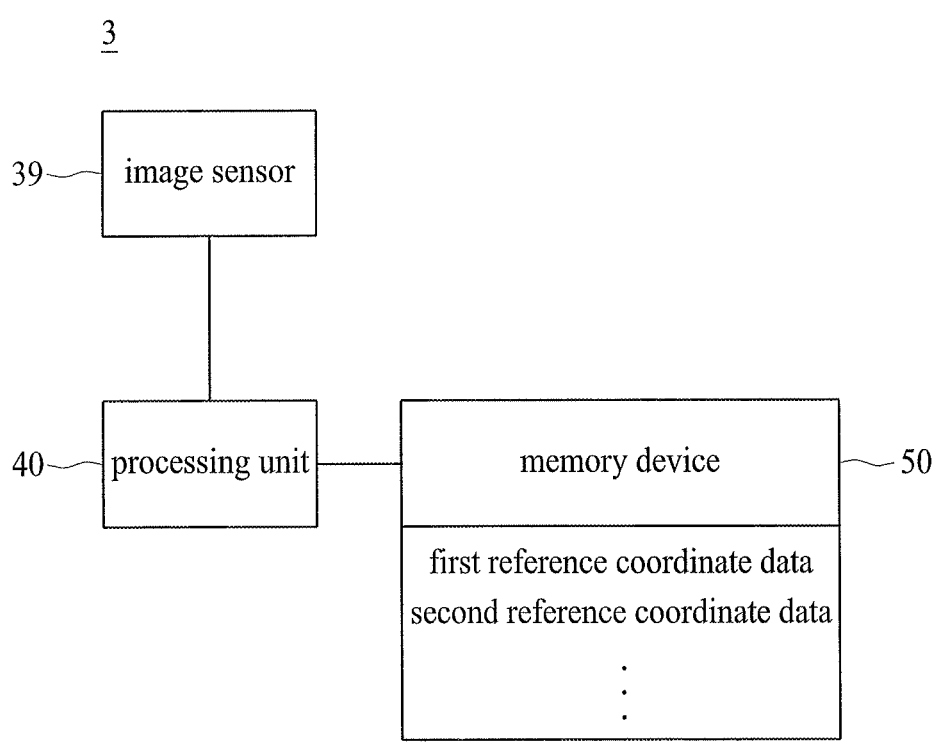
FIG. 5 is a block diagram schematically depicting an optical touch system according to one embodiment of the present invention.
Figure 6:
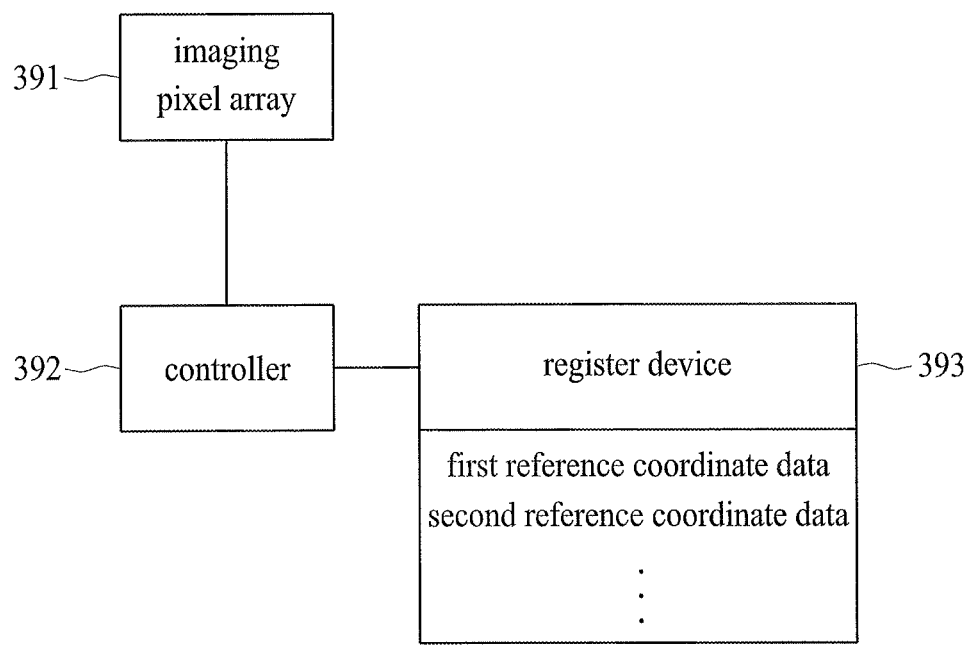
FIG. 6 is a block diagram schematically depicting an image sensor according to one embodiment of the present invention.

Referring to FIGS. 5 and 6, in one embodiment, the optical touch system 3 may comprise a memory device 50 coupled with the processing unit 40 that is connected to the image sensor 39, wherein the first reference coordinate data and the second reference coordinate data is stored in the memory device 50 as shown in FIG. 5. In another embodiment, the image sensor 39 comprises a controller 392, an imaging pixel array 391 coupled with the controller 392, and a register device 393 connected with the controller 392, wherein the first reference coordinate data and the second reference coordinate data is stored in the register device 393.

In addition to assigning different reference coordinate data to different touch regions, the deviations between the real position of an object and the computing position of the object can be reduced by adjusting the display content presented by a display device when a fixed reference coordinate data is used to represent the image sensor.

Figure 7:
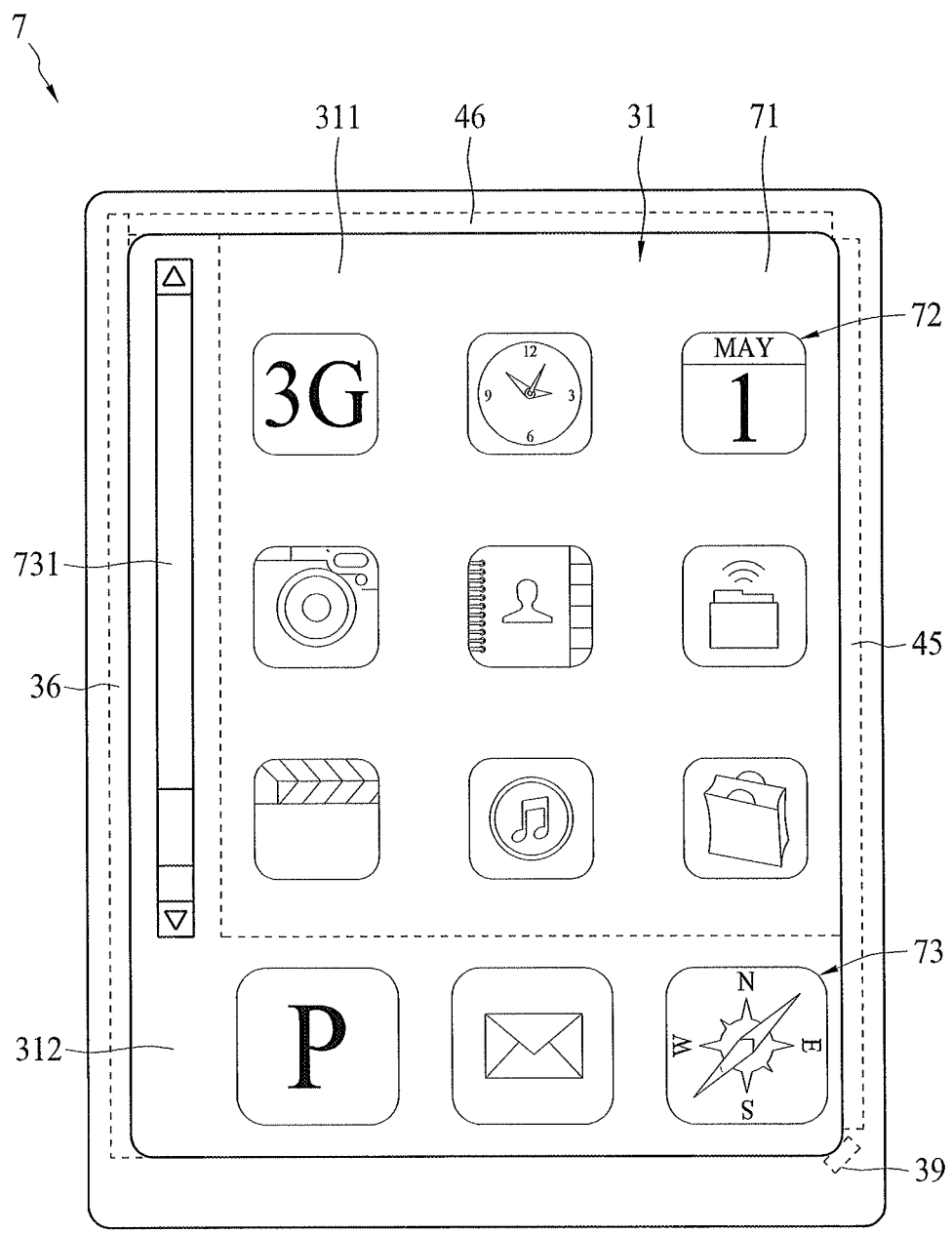
FIG. 7 is an illustration schematically depicting an electronic apparatus according to one embodiment of the present invention.

FIG. 7 is an illustration schematically depicting an electronic apparatus 7 according to one embodiment of the present invention. Referring to FIGS. 3 and 7, the electronic apparatus 7 comprises an optical touch system 3 as shown in FIG. 3 and a display device 71 disposed adjacent to the optical touch system 3. The optical touch system 3 may comprise a touch surface 31, a reflective member 36, an image sensor 39, and a processing unit 40. The display device 71 shows information and control widgets/icons provided by the electronic apparatus 7.

The touch surface 31 comprises a first touch region 311 and a second touch region 312, and the optical touch system 3 comprises a first reference coordinate data and a second reference coordinate data corresponding to the first touch region 311 and the second touch region 312. The display device 71 shows a first display content 72 in the first touch region 311 and a second display content 73 in the second touch region 312. The image sensor 39 captures at least one image of an object. The processing unit 40 is configured to compute the coordinate data of the object according to the image of the object. The electronic apparatus 7 controls the first display content 72 in the first touch region 311 or the second display content 73 in the second touch region 312 according to the computed coordinate data of the object.

In order to accurately calculate coordinate data of the object, the optical touch system 3 uses the first reference coordinate data when the object is in the first touch region 311, and uses the second reference coordinate data when the object is in the second touch region 312. As shown in FIG. 7, under some circumstances, the optical touch system 3 only uses the first reference coordinate data. Since only the first reference coordinate data is used, significant deviations between the actual position of the object and the computed position of the object may occur when the object moves in the second touch region 312, causing incorrect operations. In order to avoid incorrect operations, the electronic apparatus 7 will provide, in the second touch region 312, display content that can be correctly manipulated by a user without the requirement of computing accurate positions of the object. For example, scroll bars 731 are suitable for being used in the second touch region 312, or other icons or widgets that can be correctly manipulated by a user without the requirement of accurately computed positions of the object.

Moreover, the electronic apparatus 7 can provide icons that are larger than those displayed in the first touch region 311 for the second touch region 312 as shown in FIG. 7. The larger icons allow using inaccurately computed coordinate data of an object and can reduce incorrect operations.

Figure 8:
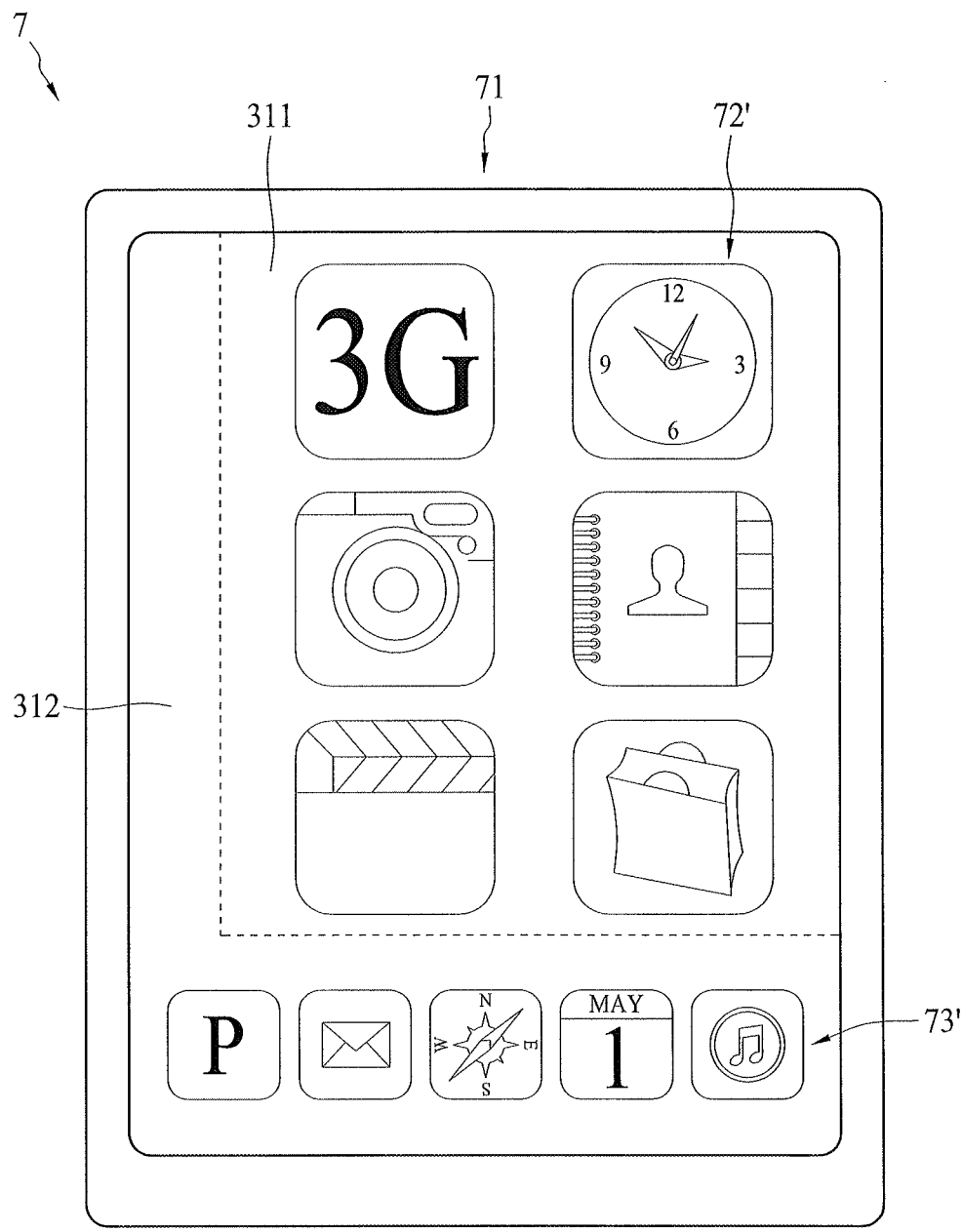
FIG. 8 is an illustration schematically depicting display content shown in the first touch region and display content shown in the second touch region according to another embodiment of the present invention.

FIG. 8 is an illustration schematically depicting display content 72' shown in the first touch region 311 and display content 73' shown in the second touch region 312 according to another embodiment of the present invention. As shown in FIG. 8, in one embodiment, the optical touch system 3 may only use the second reference coordinate data to calculate the coordinate data of an object. Since only the second reference coordinate data is used, significant deviations between the actual position of the object and the computed position of the object may occur when the object moves in the first touch region 311, causing incorrect operations. In order to avoid incorrect operations, the electronic apparatus 7 will provide, in the first touch region 311, display content that can be correctly manipulated by a user without the requirement of computing accurate positions of the object. For example, icons or widgets that can be correctly manipulated by a user without the requirement of computing accurate positions of the object are provided in the first touch region 311; or icons that are larger than those displayed in the second touch region 312 are provided in the first touch region 311 as shown in FIG. 8.

Figure 9:
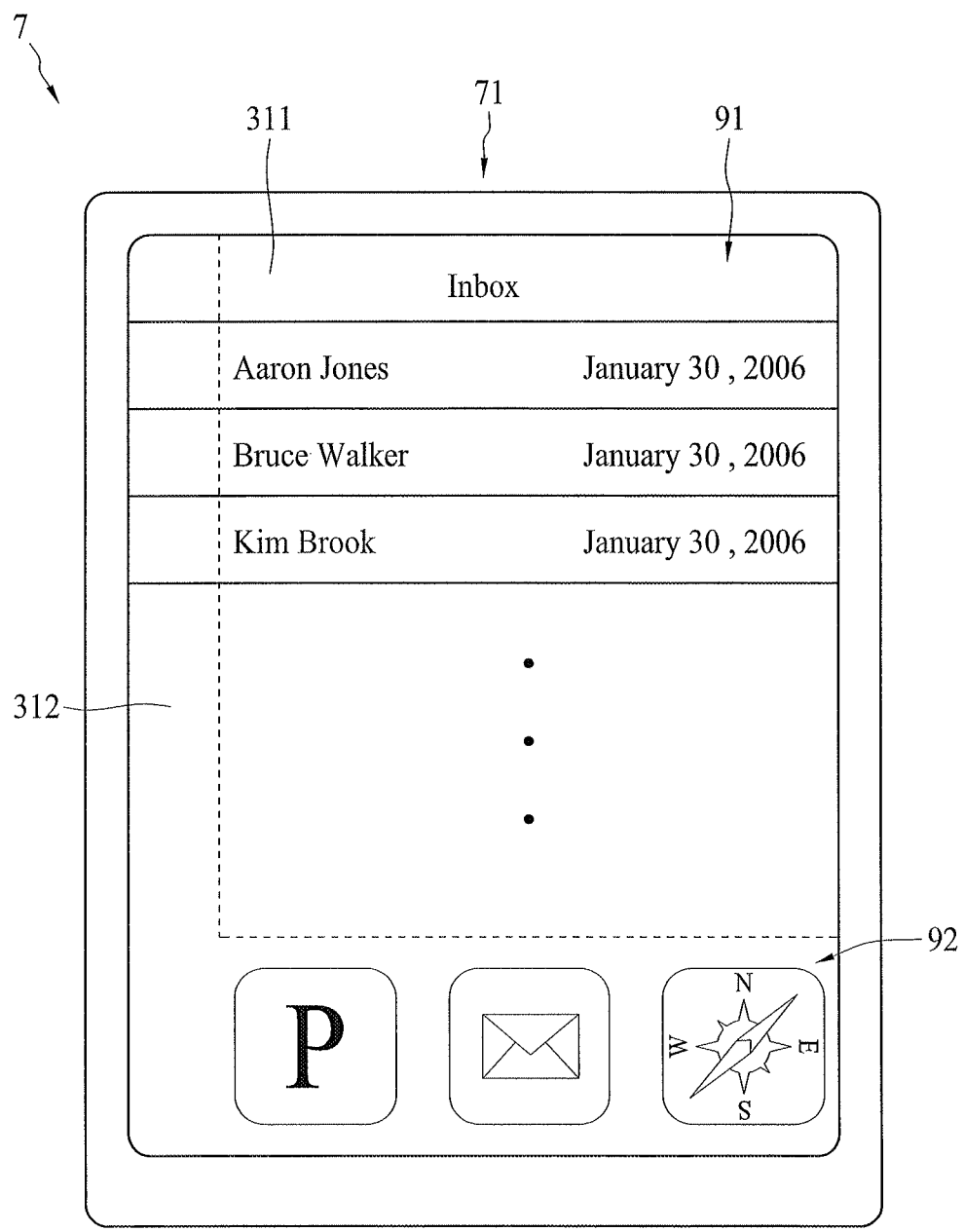
FIG. 9 is an illustration schematically depicting display content shown in the first touch region and display content shown in the second touch region according to another embodiment of the present invention.
Figure 10:
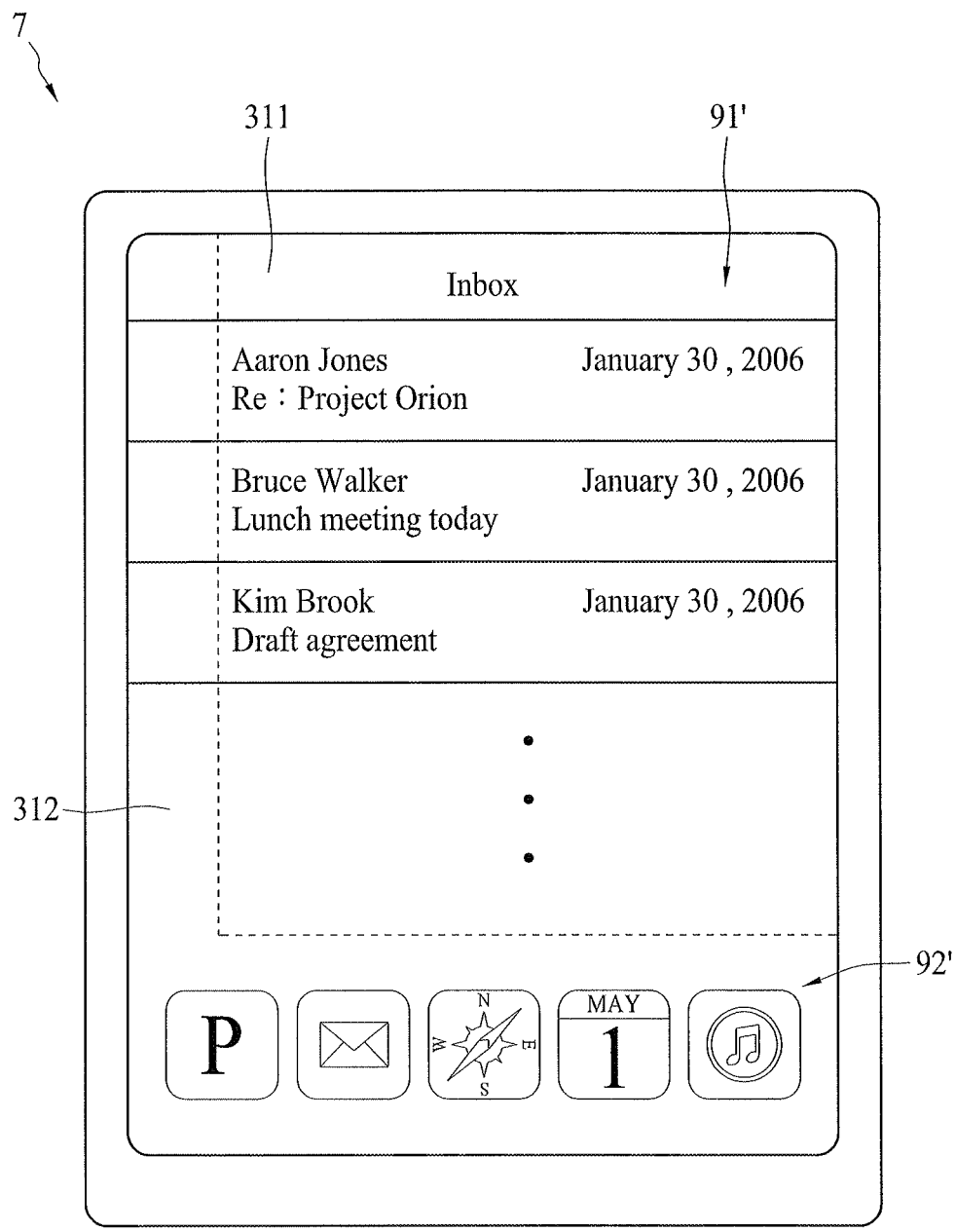
FIG. 10 is an illustration schematically depicting display content shown in the first touch region and display content shown in the second touch region according to another embodiment of the present invention.

FIG. 9 is an illustration schematically depicting display content 91 shown in the first touch region 311 and display content 92 shown in the second touch region 312 according to another embodiment of the present invention. FIG. 10 is an illustration schematically depicting display content 91' shown in the first touch region 311 and display content 92' shown in the second touch region 312 according to another embodiment of the present invention. As shown in FIG. 9, in addition to icons or widgets, the display device 71 of the electronic apparatus 7 may show information such as email content or list items. When the optical touch system 3 uses the first reference coordinate data to calculate the coordinate data of an object, the formation can be more compact because the coordinate data of the object moving in the first touch region 311 can be accurately calculated. As shown in FIG. 10, when the optical touch system 3 uses the second reference coordinate data to calculate the coordinate data of an object, less dense information is presented in the first touch region 311 because accurately computed coordinate data of the object in the first touch region 311 cannot be easily obtained. As such, inaccurately computed coordinate data of the object become acceptable and incorrect operations can accordingly be reduced. As shown in FIGS. 9 and 10, when the optical touch system 3 changes the use of the first reference coordinate data to the use of the second reference coordinate data, the list items in the first touch region 311 are widened.

Figure 11:
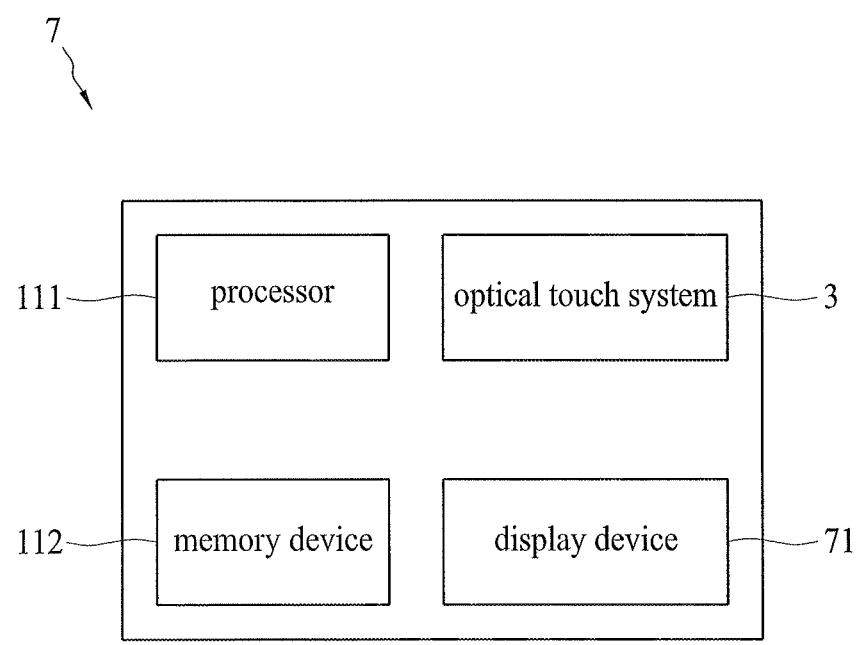
FIG. 11 is a block diagram illustrating an electronic apparatus according to one embodiment of the present invention.

FIG. 11 is a block diagram illustrating an electronic apparatus 7 according to one embodiment of the present invention. As shown in FIG. 11, the electronic apparatus 7 may comprise a processor 111, a memory device 112, an optical touch system 3, and a display device 71. The processor 111 is configured to process programs for operating the electronic apparatus 7. For example, the processor 111 may control the first display content 72 presented in the first touch region 311 or the second display content 73 presented in the second touch region 312 according to the calculated coordinate data of an object. The memory device 112 stores programs and data used for the operation of the electronic apparatus 7.

Figure 12:
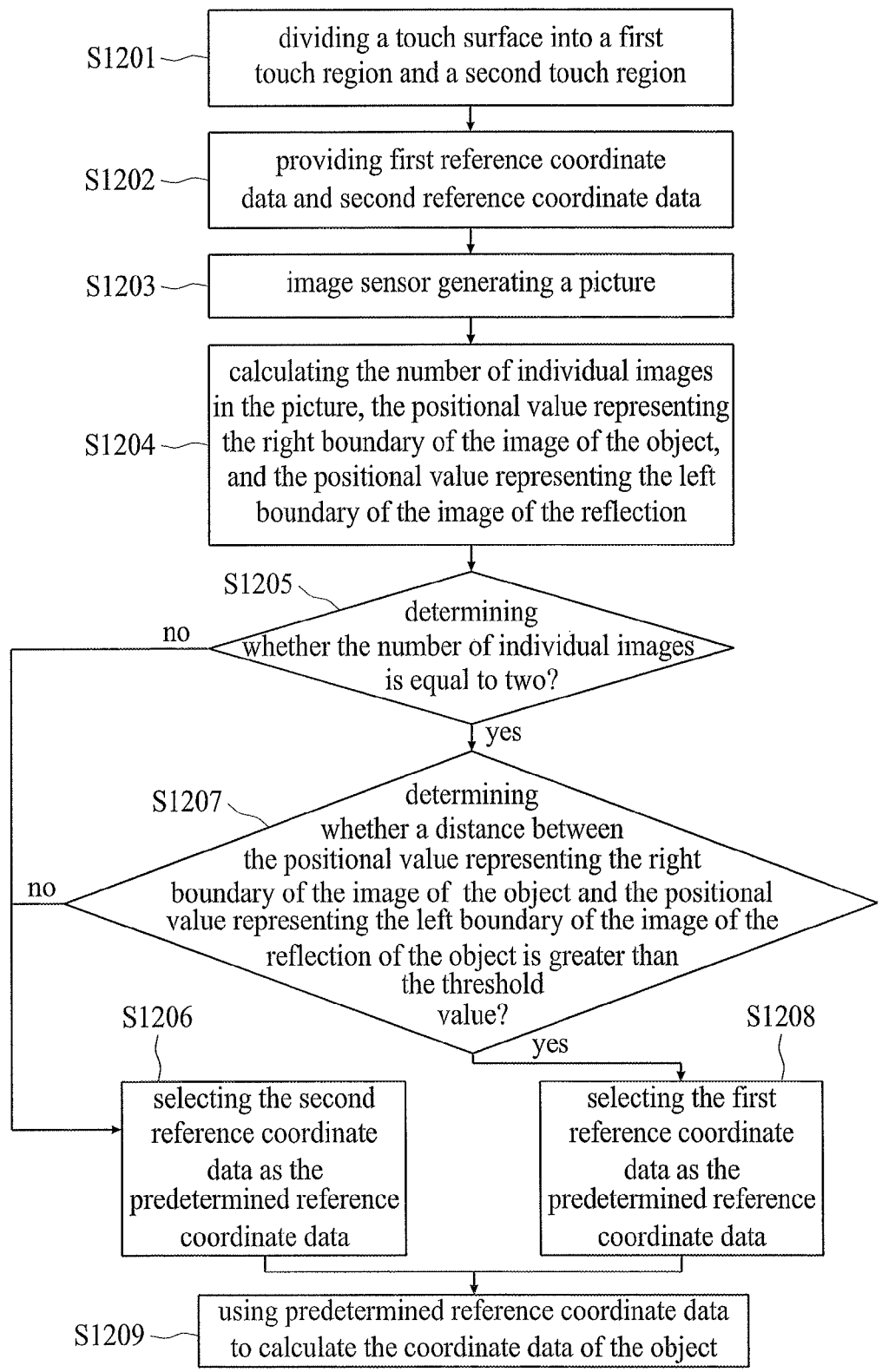
FIG. 12 is a flow chart demonstrating the steps of a method of calculating coordinate data of an object in an optical touch system according to one embodiment of the present invention.

FIG. 12 is a flow chart demonstrating the steps of a method of calculating coordinate data of an object in an optical touch system according to one embodiment of the present invention. As shown in FIG. 12, in Step S1201, a touch surface is configured as including a first touch region and a second touch region, wherein the second touch region comprises a region extending adjacent to two edges of the touch surface opposite to the image sensor.

In Step S1202, first reference coordinate data is assigned for use in the calculation of the coordinate data of an object in the first touch region, and second reference coordinate data is assigned for use in the calculation of the coordinate data of an object in the second touch region.

In Step S1203, an image sensor generates a picture that may comprise an image of an object and an image of a reflection of the object.

In Step S1204, the number of individual images in the picture is calculated, and the positional value representing the right boundary of the image of the object and the positional value representing the left boundary of the image of the reflection are calculated.

In Step S1205, while determining whether the number of individual images is equal to two, if the number of individual images is not equal to two, then the object is considered as being in the second touch region, and the second reference coordinate data is selected as the predetermined reference coordinate data (Step S1206).

In Step S1207, the distance between the positional value representing the right boundary of the image of the object and the positional value representing the left boundary of the image of the reflection of the object is compared with the threshold value. If the distance between the positional value representing the right boundary of the image of the object and the positional value representing the left boundary of the image of the reflection is not greater than the threshold value, the second reference coordinate data is selected as the predetermined reference coordinate data (Step S1206). If the distance between the positional value representing the right boundary of the image of the object and the positional value representing the left boundary of the image of the reflection is greater than the threshold value, the first reference coordinate data is selected as the predetermined reference coordinate data (Step S1208).

In Step S1209, the predetermined reference coordinate data is used to calculate the coordinate data of the object.

Figure 13:
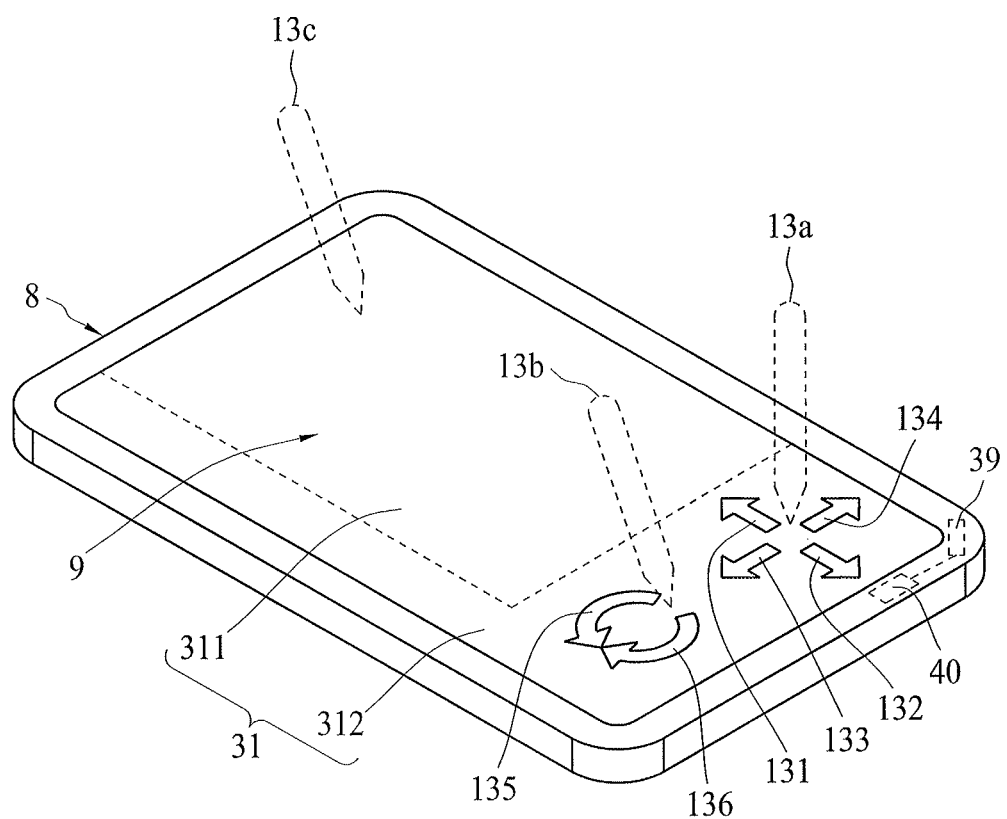
FIG. 13 schematically depicts an optical touch system and a display device according to one embodiment of the present invention.

As shown in FIG. 13, the optical touch system 8 can be disposed on a display device 9. The optical touch system 8 may comprise a touch surface 31, an image sensor 39, and a processing unit 40. The touch surface 31 may comprise a first touch region 311 and a second touch region 312. The image sensor 39 is configured to capture at least one image of an object 13a, 23b or 13c. The processing unit 40 is coupled with the image sensor 39 and configured to calculate the coordinate data of an object using the at least one image. The processing unit 40 is further configured to output coordinates of the object 13c when an analysis shows that the object 13c appears in the first touch region 311 or the primary operating region. The processing unit 40 is further configured to output a gesture performed by an object when an analysis shows that an object 13a or 13b appears in the second touch region 312.

In one embodiment, the processing unit 40 is configured to provide a command according to the above-mentioned gesture, and the command may be used to control the content shown on the display device 9.

Specifically, in one embodiment, when the processing unit 40 identifies that the object 13a is in the second touch region 312, the processing unit 40 may calculate the coordinate data of the object 13a over a predetermined time period during which the object 13a moves, and determines which gesture a user performs according to the coordinate data. For example, if the coordinate data calculated by the processing unit 40 indicates that the object 13a gradually moves to the left, the processing unit 40 then determines that the object 13a performs a gesture of moving left as indicated by an arrow 133. If the coordinate data calculated by the processing unit 40 indicates that the object 13a gradually moves to the right, the processing unit 40 then determines that the object 13a performs a gesture of moving right as indicated by an arrow 134. If the coordinate data calculated by the processing unit 40 indicates that the object 13a gradually moves upward, the processing unit 40 then determines that the object 13a performs a gesture of moving upward as indicated by an arrow 131. If the coordinate data calculated by the processing unit 40 indicates that the object 13a gradually moves downward, the processing unit 40 then determines that the object 13a performs a gesture of moving downward as indicated by an arrow 132. The definition of the directions in the above embodiments is as an example. The present invention is not limited to such definition.

The coordinate data of the object 13a may not only change linearly, but also change curvedly. For example, if the coordinate data of the object 13b calculated by the processing unit 40 sequentially forms a curve oriented counterclockwise, the object 13b performs a gesture of rotating counterclockwise as indicated by an arrow 135. If the coordinate data of the object 13b calculated by the processing unit 40 sequentially forms a curve oriented clockwise, the object 13b performs a gesture of rotating counterclockwise as indicated by an arrow 136.

With different gestures, the processing unit 40 may output different events. For example, a linearly moving gesture may initiate a Move event. A curved gesture may initiate a Rotate event. The optical touch system 8 can be customized according to operational requirements, configured as having different events corresponding to different gestures to meet the operational requirements.

Gestures can be determined by analyzing the trend of the change of continuously obtained coordinate data of an object. For example, if continuously obtained coordinate data shows a trend of moving along a direction, it can be determined that the object moves along that direction. If continuously obtained coordinate data shows a trend of moving curvedly, it can be determined that the object performs a rotating gesture.

In addition, a gesture can be determined by a change of successive vectors. For example, a first vector representing an object moving from a first time to a second time, a second vector representing the object moving from a second time to a third time, and a third vector representing the object moving from a third time to a fourth time can all be determined according to the received object images. Next, the successive changes of the first, second, and third vectors can be determined. Finally, the successive changes are used to determine which gesture is performed. The method of calculating vectors of a moving object used in current optical touch systems can be applied. The details are not described to avoid a redundant description.

Figure 14:
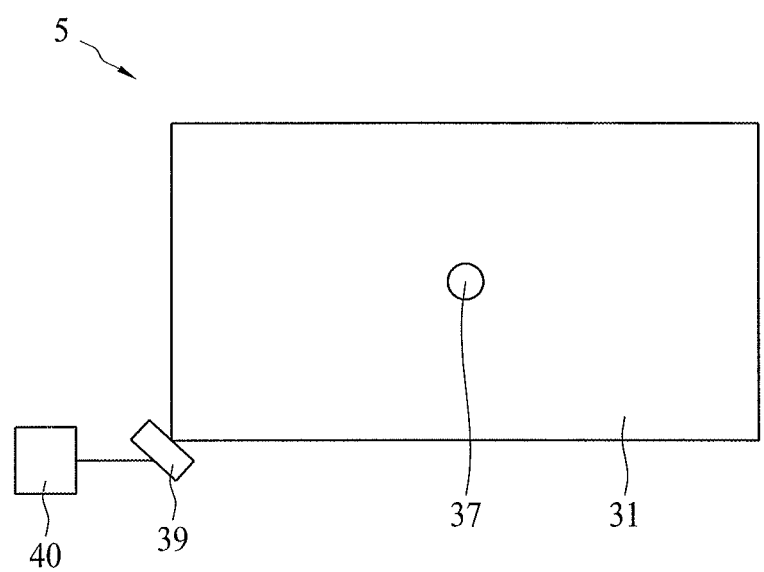
FIG. 14 schematically depicts an optical touch system according to one embodiment of the present invention.
Figure 15:
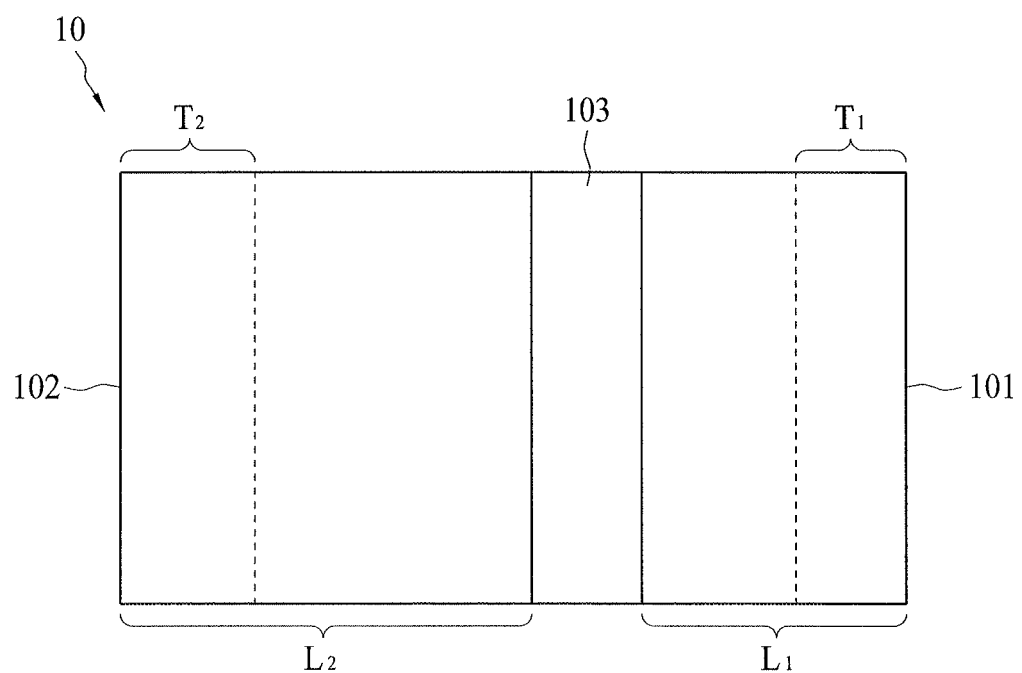
FIG. 15 is an illustration showing a picture according to one embodiment of the present invention.

Referring to FIGS. 14 and 15, the optical touch system 5 comprises at least one image sensor 39 and a processing unit 40. The at least one image sensor 39 may generate a picture 10 comprising at least one object image 103. The at least one image sensor 39 can be represented by a first reference coordinate data or a second reference coordinate data, wherein the first reference coordinate data corresponds to the primary operating region, and the second reference coordinate data corresponds to the region other than the primary operating region. The processing unit 40 is coupled with the image sensor 39. The processing unit 40 is configured to determine a distance $L_1$ or $L_2$ between a predetermined boundary 101 or 102 of the picture 10 and the object image 103. When the distance $L_1$ or $L_2$ is greater than a threshold $T_1$ or $T_2$, the processing unit 40 uses the first reference coordinate data as predetermined reference coordinate data.

In one embodiment, the predetermined boundary 101 or 102 is the left boundary or right boundary of the picture 10.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. An optical touch system comprising:
    a touch surface comprising a first touch region and a second touch region;
    a reflective member configured to generate a reflection of an object on the touch surface;
    an image sensor configured to provide an image of the object and an image of the reflection, wherein the image sensor is represented by either first reference coordinate data or second reference coordinate data; and
    a processing unit configured to compute coordinate data of the object using the first reference coordinate data, the image of the object and the image of the reflection when the object is in the first touch region, and configured to compute the coordinate data of the object using the second reference coordinate data, the image of the object, and the image of the reflection when the object is in the second touch region.

2. The optical touch system of claim 1, wherein the second touch region extends along the reflective member.

3. The optical touch system of claim 1, wherein the second touch region extends along an edge of the touch surface that extends between the image sensor and the reflective member.

4. The optical touch system of claim 1, wherein the second touch region comprises a region extending adjacent to two edges of the touch surface.

5. The optical touch system of claim 1, further comprising a memory device coupled with the processing unit and storing the first reference coordinate data and the second reference coordinate data.

6. The optical touch system of claim 1, wherein the image sensor comprises a register device configured to store the first reference coordinate data and the second reference coordinate data.

7. The optical touch system of claim 1, wherein the processing unit is configured to compare a distance between a positional value representing a right boundary of the image of the object and a positional value representing a left boundary of the image of the reflection with a threshold value to determine using the first reference coordinate data or the second reference coordinate data.

8. The optical touch system of claim 7, wherein the processing unit uses the first reference coordinate data when the distance between the positional value representing the right boundary of the image of the object and the positional value representing the left boundary of the image of the reflection is greater than the threshold value; otherwise, the processing unit uses the second reference coordinate data.

9. The optical touch system of claim 1, wherein the first reference coordinate data is predetermined reference coordinate data, and when the processing unit identifies that the image of the object connects with the image of the reflection, the processing unit uses the second reference coordinate data to compute the coordinate data of the object.

10. An optical touch system comprising:
    a touch surface comprising a first touch region and a second touch region;
    an image sensor configured to generate at least one image of an object, wherein the image sensor is represented by either first reference coordinate data or second reference coordinate data; and
    a processing unit configured to select either the first reference coordinate data or the second reference coordinate data as predetermined coordinate data according to the object being in either the first touch region or the second touch region.

11. The optical touch system of claim 10, wherein the second touch region comprises a region extending adjacent to two edges of the touch surface.

12. The optical touch system of claim 10, further comprising a memory device coupled with the processing unit and storing the first reference coordinate data and the second reference coordinate data.

13. The optical touch system of claim 10, wherein the image sensor comprises a register device configured to store the first reference coordinate data and the second reference coordinate data.

14. An electronic apparatus comprising:
    an optical touch system comprising:
        a touch surface comprising a first touch region and a second touch region,
        an image sensor configured to generate at least one image of an object, and
        a processing unit configured to compute coordinate data according to the at least one image of the object; and
    a display device disposed adjacent to the optical touch system, configured to provide first display content in the first touch region and second display content in the second touch region,
    wherein the electronic apparatus is configured to control the first display content in the first touch region or the second display content in the second touch region according to the coordinate data of the image of the object.

15. The electronic apparatus of claim 14, wherein the first display content comprises an icon, a widget, or a list item.

16. The electronic apparatus of claim 14, wherein the second display content comprises an icon or a widget.

17. The electronic apparatus of claim 14, wherein the first touch region corresponds to first reference coordinate data, and the second touch region corresponds to second reference coordinate data.

18. The electronic apparatus of claim 17, wherein the first display content comprises at least one icon or widget, the second display content comprises at least one icon or widget, the optical touch system uses the first reference coordinate data to compute the coordinate data of the object, wherein the at least one icon or widget of the second display content is larger than the at least one icon or widget of the first display content.

19. The electronic apparatus of claim 17, wherein the first display content comprises a plurality of list items, wherein the plurality of list items are widened when the optical touch system changes the use of the first reference coordinate data to the second reference coordinate data.

20. An optical touch system comprising:
    a touch surface comprising a first touch region and a second touch region;
    an image sensor configured to generate at least one image of an object; and
    a processing unit coupled with the image sensor, configured to output coordinate data of the object when the object is in the first touch region and to output a gesture event when the object is in the second touch region.

21. The optical touch system of claim 20, wherein the processing unit is configured to provide a command for controlling display content of a display device according to the gesture.

22. The optical touch system of claim 20, wherein the gesture comprises a gesture of moving upward, moving downward, moving left, moving right, rotating clockwise or rotating counterclockwise.

23. The optical touch system of claim 20, wherein the gesture comprises the coordinate data of the object detected over time.

24. The optical touch system of claim 20, wherein the gesture comprises changes of vector data related to the object.

25. The optical touch system of claim 20, further comprising a reflective member configured to generate a reflection of the object, wherein the second touch region extends by the reflective member.

26. The optical touch system of claim 25, wherein the second touch region extends by an edge of the touch surface that extends between the image sensor and the reflective member.

27. The optical touch system of claim 20, wherein the second touch region comprises a region extending adjacent to two edges of the touch surface.

28. An optical touch system comprising:
- at least one image sensor configured to generate a picture comprising at least one image of an object, represented by either first reference coordinate data or second reference coordinate data; and
- a processing unit configured to determine a distance between a boundary of the image of the object and a predetermined boundary of the picture, and to use the first reference coordinate data as predetermined coordinate data when the distance is greater than a threshold value.

29. The optical touch system of claim 28, wherein the predetermined boundary is a left or right boundary of the picture.

* * * * *